United States Patent [19]
Klein

[11] Patent Number: 4,857,368
[45] Date of Patent: Aug. 15, 1989

[54] COATING METHOD

[75] Inventor: Rudolf Klein, Oberhausen, Fed. Rep. of Germany

[73] Assignee: C. Voigt Söhne GmbH & Co., Fed. Rep. of Germany

[21] Appl. No.: 194,485

[22] Filed: May 16, 1988

[30] Foreign Application Priority Data

Oct. 17, 1987 [DE] Fed. Rep. of Germany ....... 3735305

[51] Int. Cl.$^4$ .............................................. B05D 3/02
[52] U.S. Cl. .................. 427/393; 427/393.6; 428/425.1; 428/425.5
[58] Field of Search .................. 427/388.2, 393.6, 393, 427/393.5; 428/425.1, 425.5

[56] References Cited

U.S. PATENT DOCUMENTS 4,710,560 12/1987 Vu ..................................... 427/388.2

Primary Examiner—Michael Lusignan
Attorney, Agent, or Firm—Bierman & Muserlian

[57] ABSTRACT

A method for forming a polyurethane coating on a substrate comprising mixing a liquid polyurethane prepolymer with an isocyanate content of 2.5 to 8.5% with water containing a carbon dioxide binding agent, a water absorbing agent and optionally at least one member of the group consisting of fillers and additives, coating the mixture onto a substrate within the processing time and curing the mixture at room temperature to obtain a polyurethane coating securely attached to the substrate which may be used as a coating for playground and sport areas and for construction sealing.

13 Claims, No Drawings

COATING METHOD

STATE OF THE ART

Polyurethane coatings are used in the construction and building fields as sealings and for the construction of sport and playground surfaces (cf. Polyurethan, Kunststoff-Handbuch, 2 Auflage, Bd. 7, pp. 462). The coatings are directly produced on site from the polyurethane raw materials, isocyanate-containing polyurethane prepolymers and polyols. Due to the ability of the isocyanate group to react with water giving off carbon dioxide, care must be taken that the substrate as well as the rubber granulates used as filler are free of water, since otherwise problems of adhesion to the substrate arise or—instead of a solid coating—a foam-like substance is formed. This presents problems especially in the case of outdoor installations and limits the time in which such coatings can be manufactured to dry fair weather periods. In areas with constant high humidity, such coatings can only be produced at great expense in terms of covering and drying.

OBJECTS OF THE INVENTION

It is an object of the invention to provide a novel method for producing polyurethane coatings on a substrate which can be formed in humid climates, on damp substrates and/or with moisture containing fillers or elastic granulate without decrease of adhesion to the substrate or without uncontrolled foam development.

It is another object of the invention to provide novel polyurethane coated surfaces.

These and other objects and advantages of the invention will become obvious from the following detailed description.

THE INVENTION

The novel method of the invention for forming a polyurethane coating on a substrate comprises mixing a liquid polyurethane prepolymer with an isocyanate content of 2.5 to 8.5% with water containing a carbon dioxide binding agent, a water absorbing agent and optionally at least one member of the group consisting of fillers and additives, coating the mixture onto a substrate within the processing time and curing the mixture at room temperature to obtain a polyurethane coating securely attached to the substrate. The coatings are useful as smooth playground or sport area coatings or those containing an elastic granular product as sealant in the construction field, primarily in roofing or on parking decks or as a spray coating.

It has been found that polyurethane prepolymers with an isocyanate content of 2.5 to 8.0% can be mixed with water and be cured without significant foam formation taking place, if a carbon dioxide-binding agent and a water-absorbing agent are added to this mixture.

The mixtures have a processing time at 20° C. of 15 to 45 minutes and they can be cast in this time to form a self-leveling layer and cure within 24 hours to form a solid coating. Surprisingly, excellent adhesion to the substrate is achieved even if the substrate before coating was damp. In the same manner, granular product dispersed in the mixture or dispersed toward the end of the processing time onto the mixture is bonded tightly even if it was moist. This surprising result permits the manufacture of the coating of the invention without special precautionary measures even in humid or rainy weather.

Polyurethane prepolymers to be used in the invention are all commercially available isocyanate-containing prepolymers which are obtained by reaction of a multi-functional isocyanate with polyester or polyether polyols. It is necessary that the isocyanate content be in the range of 2.5 to 8.0%, preferably in the range of 3 to 5%, and the prepolymers are liquid. Preferred is a viscosity in the range of 2,000 to 6,000 mPas (20° C.) but it is also possible to adjust the viscosity of a high-viscosity prepolymer by the addition of compatible organic solvents such as, for example, esters, ketones or aromatic substances or by the addition of low-viscosity softeners like phosphor-organic compounds or phthalates to a value within this range.

Since the solvents, like the non-converted water, diffuse out of the cured coating, they bring about a given degree of shrinkage of the coating. On the one hand, this leads to internal stress of the material which, since it acts upon the adhesion surface, must be limited and on the other hand a slight internal tensional stress acts counter to a potential bubble formation at sites of imperfect adhesion to the substrate. An amount of solvent up to 20% of the prepolymer can, therefore, still be used.

Softeners remain in the cured coating and since they influence the softness of the final product, their use must be adjusted to the particular prepolymer and potentially additionally used linking agents to adjust the desired elasticity of the finished coating.

Examples of carbon dioxide-binding agents are metal oxides or hydroxides which react with carbon dioxide-forming carbonates. Preferred are oxides or hydroxides of calcium, magnesium or zinc.

Water-absorbing agents are substances, which due to their polarity or gel structure, are able to hold water molecules and which just as readily give water off again. Examples of appropriate organic materials are flour, starch, particularly those that have been rendered soluble, so-called cold water-soluble starches, dextrin or methylcellulose.

Examples of appropriate inorganic materials are bentonite or silicon dioxide, the latter either as finely distributed silica gel or, preferably as high dispersed silicic acid.

The mixtures to be processed by the invention may also contain other additives such as fillers, coloring agents, color pigments, accelerators, linking agents, polyols, inhibitors, or wetting agents.

Fillers are particularly granular products with an average size of 3 to 6 mm of elastic material such as rubber, polyurethane or synthetic rubber. They can be used in amounts of 20 to 45% by weight relative to the finished mixture in the mixture to be cast or also dispersed into the freshly cast mixture. Coloring agents and pigments are frequently required to give the coating color.

Polyols, accelerators, stabilizers, and linking agents can be used within the frame of those known and customarily used with polyurethanes to control curing or linking reactions. For example, occasionally with strongly inclined surfaces, a very brief processing time is needed to prevent the coating from flowing off to one side. The hardness of the coating can be reduced by the selection of the prepolymers, by their mixing with softeners or by the reaction with the used polyols. It can, however, also be increased through the use of additional mult-functional compounds, the linking agents, so that depending on the requirements either soft playground coating or hard tennis court coatings are obtained. A use of wetting agents such as anionic, cationic, amphoteric or non-ionic surfactants in amounts of 0.1 to 5% relative to the total mixture is not absolutely essential, but it offers a twofold advantage: (1) the distribution of the water in the prepolymer is improved and, hence, dissocation is delayed and (2) the viscosity of the corresponding emulsions is lowered.

The amounts of the individual components are determined so that a free-flowing mixture is obtained which distributes well on the substrate (i.e. asphalt layer, cement, wood or synthetic matt) and from which stirred-in air bubbles can escape without leaving craters. On the other hand, the mixture must be adjusted so that no foam formation and no dissociation of the aqueous phase takes place. Keeping in mind these general requirements, the components can be used in the following mixture ratios:

100 parts by weight of polyurethane prepolymers or their solution,
  20 to 45 parts by weight, preferably 30 to 40 parts by weight of water,
  3 to 6 parts by weight, preferably 4.5 to 5.5 parts by weight of an additive of 70 to 50% carbon dioxide-binding agent, 30 to 50% of water-absorbing agent and optionally
  0.1 to 5% of a wetting agent. In addition, 1 to 2 parts by weight of coloring agent or color pigments and/or
  20 to 45 parts by weight of a granular product of a rubber elastic material can be added to this mixture.

For the manufacture of the mixture of the invention, which after curing forms the coating, the individual components can be mixed in random sequence in a mixing unit such as a commercially available wing stirrer or a mixing assembly customary at building sites consisting of a drilling machine with attached stirring rod. Since, on the one hand, finely distributed solid material can be worked into the polyurethane prepolymer with these machines only poorly and with the development of dust and, since, on the other hand, the reaction of the isocyanate and, hence, the curing process begins with the contact of the prepolymer with water, the following method of producing the mixture has proven useful: the carbon dioxide-binding agent, wetting agent and perhaps filler and additives including linking agent are pre-dispersed in water in the desired ratios. Such aqueous dispersions are storable for a long time and only need to be stirred up shortly before being used. To produce the mixture according to the invention only the polyurethane prepolymer which is possibly premixed with a solvent, softener or inhibitor is wetted with the aqueous dispersion and mixed (approximately 30 seconds at 500 to 2000 rpm). An optional reaction accelerator can be added. Similarly, it is advisable to add in this step the elastic granulate as far as such coatings are wanted. The mixture is immediately cast on the substrates and distributed.

Toward the end of the processing time when the mixture has become sufficiently tough that granules scattered on the surface are still wetted but no longer sink into the mixture, the coating surface can be covered with a distributed rubber-elastic material.

Coatings manufactured with the mixtures of the invention with or without granulate fillers, distributed with granular products or not are useful as coatings for playgrounds and sportsfields. Coatings not filled with rubber-elastic granular matter and not covered by distributed material are useful as tennis court coatings or as sealants in the construction and building field. Coating mixtures which are filled with or without a fine-grained granulate (average size 0.5 to 1 mm) are particularly suitable as a spray coating for new coatings and sealants or for repairing old coatings.

In the following examples there are described several preferred embodiments to illustrate the invention. However, it is to be understood that the application is not intended to be limited to the specific embodiments.

EXAMPLE 1

An aqueous dispersion was prepared by adding 242 g of pure magnesium oxide with an average grain size of 10 to 50 $\mu$m, 146 g of dispersed silicic acid, 28 g of iron oxide pigment and 16 g of soap powder in 3.2 kilograms of water stirred with a wing stirrer at 750 rpm.

A polyurethane prepolymer solution based on diphenylmethane diisocyanate with a 3.8% NCO content, 2500 mPas viscosity at 20° C., a density of 1.03 g/m$^3$ at 20° C. and 13% by weight of butyl acetate as solvent was prepared.

4.2 kg of the said aqueous dispersion and 4.3 kg of a polyurethane granulate were added to 10 kg of the prepolymer solution and the mixture was stirred at 1500 rpm for 30 seconds with a mixing rod attached to a drill. The mixture was cast onto a prefinished permeable asphalt surface which had been water wetted 10 minutes earlier to form a 13 mm thick layer. The mixture distributed itself to form a planar coating with a smooth surface and was cured for 24 hours at room temperature to obtain an essentially gas-free elastic material which could be walked upon. The adhesion of the layer to the asphalt foundation was faultless.

EXAMPLE 2

4.2 kg of the aqueous dispersion of Example 1 was added to 10 kg of the prepolymer solution of Example 1 and the mixture was stirred as before at 1500 rpm for 30 seconds. The mixture was cast onto a moistened, closed pore prefinished plate of compressed and bonded synthetic granular product to obtain a layer 3 mm thick. The mixture distributed itself to form a uniform planar coating and the stirred in air bubbles rose rapidly and burst. The coating surface then closed again and the substance became more viscous after 30 minutes at 20° C. An elastic polymeric granulate was scattered on the surface layer and the granules sank into the surface but were not submerged. The material was cured after 24 hours at room temperature and the elastic granular layer firmly adhering to the surface could be walked on. The adhesion to the base was faultless.

Various modifications of the products and method of the invention may be made without departing from the spirit or scope thereof and it should be understood that the invention is intended to be limited only as defined in the appended claims.

What I claim is:

1. A method for forming a polyurethane coating on a substrate comprising mixing an effective amount of a liquid polyurethane prepolymer with an isocyanate content of 2.5 to 8.5% with water containing an effective amount of a carbon dioxide binding agent, an effective amount of a water absorbing agent and optionally at least one member of the group consisting of fillers and additives, casting the mixture onto a substrate within the processing time and curing the mixture at room temperature to obtain a polyurethane coating securely attached to the substrate.

2. The method of claim 1 wherein the mixture contains 20 to 45% by weight of elastic polymeric granules based on the prepolymer.

3. The method of claim 1 wherein an elastic material is distributed on the surface of the mixture near the end of the processing time.

4. The method of claim 1 wherein the polyurethane prepolymer has a viscosity of 2000 to 6000 mPas at 20° C.

5. The method of claim 4 wherein the prepolymer contains up to 15% by weight of an organic solvent.

6. The method of claim 1 wherein the aqueous dispersion contains at least one member of the group consisting of a wetting agent, a coloring agent and a coloring pigment.

7. The method of claim 1 wherein the carbon dioxide binding agent is magnesium oxide.

8. The method of claim 1 wherein the water-absorbing agent is highly dispersed silicon dioxide.

9. The method of claim 1 wherein the water-absorbing agent is bentonite.

10. The method of claim 1 wherein the mixture contains 20 to 45 parts by weight of water and 3 to 6 parts by weight of an additive consisting essentially of 70 to 50% of a carbon dioxide binding agent, 30 to 50% of water-absorbing agent and 0.1 to 5% of a wetting agent per 100 parts by weight of the polyurethane prepolymer.

11. A playground or sports field with a coating produced by the method of claim 1.

12. A tennis court provided with a coating produced by the method of claim 1.

13. A building and construction substrate coated by the method of claim 1.

* * * * *